US008223262B2

(12) United States Patent
Kaplan et al.

(10) Patent No.: US 8,223,262 B2
(45) Date of Patent: Jul. 17, 2012

(54) CHARGING AND USE SCHEME FOR A HAND-HELD ELECTRONICS DEVICE

(75) Inventors: Jonathan Kaplan, San Francisco, CA (US); John Louis Warpakowski Furlan, Belmont, CA (US); Ariel Braunstein, San Francisco, CA (US); Simon Fleming-Wood, Oakland, CA (US); Greg Allen Cummings, San Francisco, CA (US); Eric Allan MacIntosh, Menlo Park, CA (US); Maarten Dinger, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 772 days.

(21) Appl. No.: 12/258,331

(22) Filed: Oct. 24, 2008

(65) Prior Publication Data

US 2009/0109324 A1 Apr. 30, 2009

Related U.S. Application Data

(60) Provisional application No. 60/983,121, filed on Oct. 26, 2007.

(51) Int. Cl.
*H04N 5/225* (2006.01)
*G03B 7/26* (2006.01)
(52) U.S. Cl. .................... 348/372; 348/376; 396/303
(58) Field of Classification Search ............ 348/207.99, 348/372–376; 396/203, 205, 221, 303, 304
See application file for complete search history.

(56) References Cited

U.S. PATENT DOCUMENTS

| 5,640,203 | A | * | 6/1997 | Wakui ................... 348/231.8 |
| 5,903,764 | A | * | 5/1999 | Shyr et al. .................. 713/300 |
| 6,661,462 | B2 | * | 12/2003 | Ohnogi ...................... 348/372 |
| 6,979,210 | B2 | | 12/2005 | Regen et al. | |
| 7,070,425 | B2 | | 7/2006 | Regen et al. | |
| 7,090,515 | B2 | | 8/2006 | Regen et al. | |
| 7,355,649 | B2 | * | 4/2008 | Takai ........................ 348/372 |
| 7,462,044 | B1 | | 12/2008 | Regen et al. | |
| 7,566,231 | B2 | | 7/2009 | Regen et al. | |
| 2001/0032275 | A1 | | 10/2001 | Watanabe et al. | |
| 2002/0031350 | A1 | * | 3/2002 | Ohnogi ...................... 396/429 |
| 2003/0011703 | A1 | | 1/2003 | Tanaka et al. | |
| 2003/0179301 | A1 | * | 9/2003 | Feldis et al. ............. 348/231.3 |
| 2004/0061474 | A1 | * | 4/2004 | Ozeki ........................ 320/101 |

(Continued)

OTHER PUBLICATIONS

International Search Report. Dec. 19, 2008.

*Primary Examiner* — David Ometz
*Assistant Examiner* — Ahmed A Berhan
(74) *Attorney, Agent, or Firm* — Patterson & Sheridan, LLP (57) ABSTRACT

One embodiment sets forth a method for modifying video content stored on a hand-held digital video camera (DVC). The method includes transmitting video data to a computer system to which the hand-held DVC is coupled via a data connector, receiving a request for a set of instructions related to a processing operation being performed on the computer system and involving the video data, transmitting the set of instructions to the computer system via the data connector. The method also includes drawing power from the computer system via the data connector and charging at least in part a battery associated with the hand-held DVC with the power drawn from the computer system, where the hand-held DVC remains coupled to the computer system via the data connector for the steps of transmitting, receiving, drawing and charging.

33 Claims, 5 Drawing Sheets

U.S. PATENT DOCUMENTS

| | | |
|---|---|---|
| 2004/0141070 A1 | 7/2004 | Chiku et al. |
| 2004/0246341 A1* | 12/2004 | Lee et al. ................ 348/207.99 |
| 2005/0012853 A1 | 1/2005 | Wang |
| 2007/0121427 A1 | 5/2007 | Chiu et al. |
| 2007/0237123 A1 | 10/2007 | Komoriya |

* cited by examiner

CHARGING AND USE SCHEME FOR A HAND-HELD ELECTRONICS DEVICE

CROSS-REFERENCE TO RELATED APPLICATIONS

This application claims the priority benefit of provisional U.S. Patent Application Ser. No. 60/983,121, filed Oct. 26, 2007, the subject matter of which is hereby incorporated by reference.

BACKGROUND OF THE INVENTION

1. Field of the Invention

The present invention relates generally to hand-held electronics devices and, more specifically, to a charging and use scheme for a hand-held electronics device.

2. Description of the Related Art

Digital video camera (DVC) technology has developed rapidly over the past decade. A broad variety of DVCs are now available to meet the diverse needs of a wide spectrum of consumers. DVCs enable users to record video and audio clips and enable users to transfer the recorded video and audio data to a computer-readable medium through some form of connector that couples the DVC to a computer. The computer-readable medium may be, for example, a Digital Video Disc (DVD) or a computer memory. Once video and audio data is transferred to the computer memory, the user can modify or edit the video and audio data using conventional editing software.

One problem often encountered by DVC users involves maintaining the charge level of the DVC battery. As is known, most conventional DVCs operate using battery power, which is supplied by a non-removable rechargeable battery or by one or more removable, replaceable, and/or rechargeable batteries. Battery-powered DVCs may operate normally for several hours, but eventually the battery power drains, and the DVC powers off. With some designs, to recharge the DVC, a user typically has to plug the DVC into an external power source, such as an AC outlet. However, if an AC outlet is not readily available, or if the user does not have a power cord that can couple the DVC to the AC outlet, then the DVC battery cannot be recharged, and the user cannot record video or audio clips or otherwise use the DVC.

Other designs allow the DVC to be recharged through the data port of a computer system, such as a USB port of a laptop computer. However, these designs typically do not allow the user to interact with the data files stored on the DVC in any type of sophisticated fashion while the DVC is charging. As used herein, "interacting" includes accessing the data files when requested by the user and performing operations other than simple playing back or copy operations. Interacting with data files, includes, without limitation, editing the data files, merging the data files, uploading the data files to a server machine and/or deleting data files. For example, prior art DVC designs, and similar prior art mp3 player designs, only offer the options of playing back a video file or song stored on the device or streaming the video file or song on the computer system to which the device is connected. No other more sophisticated types of interactions are permitted. Thus, when a conventional DVC or other hand-held electronic device is connected a USB port and charging, the user is quite limited in the types of operations he/she can perform on the data stored on the DVC or other hand-held electronics device.

Accordingly, there remains a need in the art for more flexible, user-oriented charging scheme for DVCs.

SUMMARY OF THE INVENTION

One embodiment sets forth a method for modifying video content stored on a hand-held digital video camera (DVC). The method includes transmitting video data to a computer system to which the hand-held DVC is coupled via a data connector, receiving a request for a set of instructions related to a processing operation being performed on the computer system and involving the video data, transmitting the set of instructions to the computer system via the data connector. The method also includes drawing power from the computer system via the data connector and charging at least in part a battery associated with the hand-held DVC with the power drawn from the computer system, where the hand-held DVC remains coupled to the computer system via the data connector for the steps of transmitting, receiving, drawing and charging.

Other embodiments of the invention include a computer-readable medium that stores instructions that can configure a processing unit to implement one or more variations of the above method as well as a hand-held digital video camera having a memory that stores instructions for implementing one or more variations of the above method.

Advantageously, embodiments of the invention enables the battery or batteries of a digital video camera to be charged while a user has the digital video camera connected to a computer system to access and manipulate video content stored in the memory included within the digital video camera.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

Figure 1:
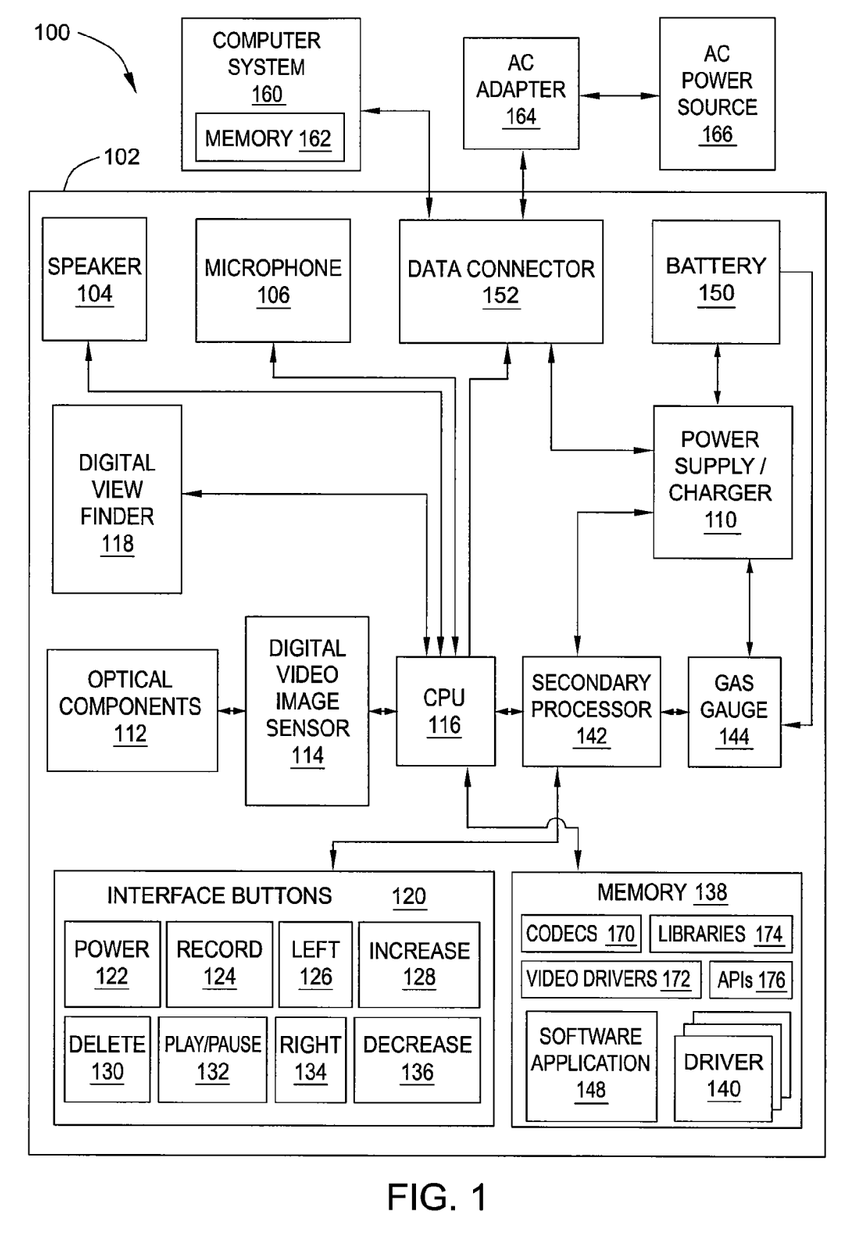
FIG. 1 is a block diagram of a hand-held device configured to implement one or more aspects of the invention.

FIG. 1 is a block diagram of a system 100 configured to implement one or more aspects of the invention. As shown, the system 100 includes, without limitation, a hand-held device (HHD) 102, a computer system 160, an AC adapter 164, and an AC power source 166. As described in greater detail herein, the HHD 102 may be connected either to the AC power source 166 through the AC adapter 164 or to the computer system 160 to allow one or more batteries within the HHD 102 to charge. In the latter scenario, embodiments of the invention enable the one or more batteries in the HHD 102 to charge while the HHD 102 is connected to the computer system 160 so that a user can edit and modify, or otherwise interact with, video content stored on the HHD 102. The computer system 160 may be any type of computing device, such as a laptop or a desktop computer, and includes a memory 162 as well as other components not shown in FIG. 1 such as a processor, a display device, a disk drive, user input devices, and the like.

The HHD 102 includes, without limitation, a data connector 152, a speaker 104, a microphone 106, a power supply 110, a battery 150, optical components 112, a digital video image sensor 114, a central processing unit (CPU) 116, a digital viewfinder 118, interface buttons 120, an internal memory 138, a secondary processor 142, and a gas gauge 144. In one embodiment, the HHD 102 is a digital video camera.

The data connector 152 is an integrated mechanism that allows the HHD 102 to be coupled to the computer system 160 or to a separate TV, and to transfer data to and from the computer system 160 and/or output video and audio to the TV. The data connector 152 may be a universal serial bus (USB) connector, a firewire connector, a HDMI connector, a serial connector, or another type of connector that is capable of connecting the HHD 102 with the computer system 160 or the TV. In alternative embodiments, the data connector 152 is not an integrated mechanism and may include a cable connector.

When in record mode, the HHD 102 is configured to capture video and audio of a particular scene through the optical components 112 and the microphone 106, respectively. The optical components 112, which may include one or more lenses, capture the scene and direct light associated with the scene onto the digital video image sensor 114. The digital video image sensor 114 converts the captured image into digital video data and then transmits the digital video data to the CPU 116 for further processing. The digital viewfinder 118 displays an image of the scene being captured while the corresponding video and audio data is being recorded. When in playback mode, the HHD 102 is configured to "play" digital videos (comprised of captured video and audio data) that are stored in the internal memory 138. The video data is displayed on the digital viewfinder 118, and the audio data is output through the speaker 104. In alternative embodiments, the digital video and audio data may be output to the TV or to a computer system for playback.

The interface buttons 120 may include mechanical buttons, such as a power button 122 and a record button 124. In a preferred embodiment, the other interface buttons, including a left button 126, a right button 134, a increase button 120, a decrease button 136, a play/pause button 132, and a delete button 130 are implemented as capacitive-touch buttons. In alternative embodiments, these other interface buttons may be implemented as induction buttons, analog-resistive buttons, or any other technically feasible button type that can be engaged by the user in an electrically conductive manner.

The power supply 110 provides power stored in the battery 150 to the other components of the HHD 102, such as the CPU 116, the secondary processor 142, and the gas gauge 144. Although not explicitly shown, the power supply 110 also provides power to the other components included within the HHD 102, including the speaker 104, the microphone 106, the digital viewfinder 118, the optical components 112, the digital video image sensor 114, the interface buttons 120, and the internal memory 138. Additionally, the power supply 110 is configured to convert power received from the computer system 160 or the AC adapter 164 to charge the battery 150 and/or to provide power to the components included within the HHD 102. In one embodiment, the battery 150 is a non-removable rechargeable battery. In alternative embodiments, the battery 150 may include one or more removable and/or replaceable batteries. The battery 105 may be a lithium ion battery or any other technically feasible type of battery.

The CPU 116 communicates with the various components within the HHD 102 to control the operations of the HHD 102. The CPU 116 may be implemented as a single chip or as a combination of multiple chips. The CPU 116 also processes inputs from the interface buttons 120. For example, when the HHD 102 is in record mode, the CPU 116 transmits the digital video data received from the digital video image sensor 114 to the digital viewfinder 118 for display. Similarly, the CPU 116 may transmit the recorded audio and video data to the internal memory 138 for storage. The recorded audio and video data may be stored as separately or together as part of a composite video file.

The secondary processor 142 is a microcontroller that includes a processor core, a memory, and an input/output interface (none shown). The memory of the microcontroller stores instructions that, when executed by the processor core of the microcontroller, cause the various features and functions associated with the secondary processor 142 described herein to be implemented.

The secondary processor 142 assists the CPU 116 in managing the interaction of the various components of the HHD 102. For example, the secondary processor 142 is configured to determine the type of external power source to which the data connector 152 is coupled (e.g., to the computer system 160 via the USB port or to the AC adapter 164). The secondary processor 142 may also manage input signals received from the various interface buttons.

In addition, the secondary processor 142 is configured to verify, when the HHD 102 is powered off, whether the battery 150 has enough charge to enable the CPU 116 to boot without causing damage to the CPU 116. As is well-known, a certain threshold level of charge should be received by the CPU 116 or order to boot properly. If the battery 150 has the requisite level of charge, then the secondary processor 142 allows the CPU 116 to boot normally. However, if the battery 150 does not have the requisite level of charge, then the secondary processor 142 prevents the CPU 116 from booting until the battery 150 is recharged to attain the requisite level of charge. In this manner, the secondary processor provides a "fail-safe" mechanism that ensures that the CPU 116 is not damaged when a user attempts to power on the HHD 102. Further, such a fail-safe mechanism also protects the battery 150, which may sometimes be damaged if allowed to fully discharge. For example, if the battery 150 is implemented as a lithium ion battery, maintaining some minimum amount of charge in the battery 150 lengthens the lifespan and charging ability of the battery 150.

The secondary processor 142 is configured to determine the level of charge in the battery 150 by querying the gas gauge 144. The gas gauge 144 is a microcontroller configured to provide accurate battery power level gauging, including generating low-battery interrupt warnings. The gas gauge 144 receives status signals from the battery 150 and, based on those signals, generates predictions for battery capacity and other operational characteristics of the battery 150. When queried by the secondary processor 142, the gas gauge 144 may be configured to provide charge status information to the secondary processor 142, including state-of-charge (i.e., USB or AC power), time-to-empty, time-to-full (when charging), time remaining at a specified current, time remaining at an average current, percentage of capacity remaining, and power (mWh) remaining, among others. In one embodiment, the gas gauge 144 is coupled to the secondary processor 142 via an inter-integrated circuit ($I^2C$) interface. In alternative embodiments, the CPU 116, the secondary processor 142 and gas gauge 144 may be combined on a single chip or may reside on combinations of different chips.

The internal memory 138 comprises either volatile memory, such as dynamic random access memory (DRAM), non-volatile memory, such as a hard disk or a flash memory module, or a combination of both volatile and non-volatile memory. The internal memory 138 stores the composite video files as well as firmware that is executed by the CPU 116 and the secondary processor 142 to control the operations of the HHD 102. The internal memory 138 also stores one or more software drivers 140 implemented as a set of program instructions configured to coordinate operations between the interface buttons 120 and the other components of the HHD 102, including the CPU 116, the secondary processor 142, and the gas gauge 144, as described in greater detail herein. For example, the program instructions that constitute the one or more drivers 140 may be executed by the CPU 116, the secondary processor 142, and/or the gas gauge 144 to cause the different battery charging modes described herein to be implemented.

A software application 148 also resides within the internal memory 138. In one embodiment, the software application 148 is an audio/video editing application that is stored in a non-volatile memory portion within the internal memory 138. When a connection between the HHD 102 and the computer system 160 is detected, an operating system stored within the memory 162 and executing on the computer system 160 is configured to automatically execute the software application 148. For example, the operating system may be configured to check the contents of the non-volatile memory portion of the internal memory 138 for a file, such as an "autoplay.inf" file, that causes the software application 148 to be automatically executed. In alternative embodiments, the software application 148 may instead be executed by the operating system based on a request from the user to execute the software application 148.

In one embodiment, the software application 148, when executed by the operating system included in the computer system 160, is configured to produce a graphical user interface (GUI) on a display device associated with the computer system 160. The GUI may present a user with graphical controls to allow the user to perform various video processing operations. Such video processing operations may include copying composite video files from the internal memory 138 to the memory 162 accessible to the computer system 160, playing composite video files, deleting composite video files from the internal memory 138, editing composite video files stored in the internal memory 138, merging two composite video files stored in the internal memory 138, attaching a composite video file to an email message, or uploading a composite video file to an online server.

Upon execution, the software application 148 also checks the computer system 160 to determine whether other software elements that provide the infrastructure necessary for the software application 148 to function fully are installed on the computer system 160. Such elements are referred to herein as "software infrastructure elements," and these elements also reside within the non-volatile memory portion of the internal memory 138 of the HHD 102. Examples of such software infrastructure elements include compression-decompression algorithms (codecs) 170 and video drivers 172. If one or more of the requisite software infrastructure elements are not installed on the computer system 160, then the software application 148 causes those software infrastructure elements to be copied from the HHD 102 and installed in the computer system 160. For example, the software application 148 may determine that certain codecs 170 and/or video drivers 172 are not installed on the computer system 160. In such a case, the software application 148 would automatically copy and install the codecs 170 and/or video drivers 172 to the computer system 160 without additional user intervention. In other embodiments, the software application 148 may wait for verification from a user before installing any missing software infrastructure elements on the computer system 160. To facilitate verifying the existence of requisite software infrastructure elements on the computer system 160, the software application 148 may add entries or keys to the registry of the computer system 160. Then, when the HHD 102 is subsequently connected to the same computer system 160, the software application 148 can simply check the registry entries or keys to determine which codecs 170, video drivers 172, and/or other software infrastructure elements are already installed on the computer system 160.

When the HHD 102 is connected to the computer system 160, and a user requests that a video processing operation be performed, the software application 148 causes the CPU 116 to transmit only the composite video file(s) relevant to that video processing operation from the internal memory 138 to the memory 162 within the computer system 160. The video processing operations are then performed by the processor included in the computer system 160. Once the copy operations have completed and the composite video files are modified, the modified composite video files may be transmitted back to the internal memory 138 for storage and/or stored locally on the computer system 160. Advantageously, as described in greater detail herein, while the HHD 102 is connected to the computer system 160 so that a user can perform processing operations on video content stored on the HHD 102, the battery 150 may be charging via the data connector 152 and the power supply 110. Offloading the video processing operations to the computer system 160 in this fashion leverages the processing infrastructure of the computer system 160, thereby reducing the processing cycles of the CPU 116, which enables the battery 150 to charge more quickly.

In addition, when the software application 148 is executing on the computer system 160, the software application 148 is configured to copy other supporting software components such as software libraries 174, application programming interfaces (APIs), and/or other application files stored within the internal memory 138 of the HHD 102 to the computer system 160, as needed, to support the video processing operations being performed on the computer system 160. Since such supporting software components are transferred to the computer system 160 only when necessary to perform a requested video processing operation, less data is transferred between the HHD 102 and the computer system 160 when processing video content, thereby reducing the processing cycles of the CPU 116, which enables the battery 150 to charge more quickly.

As the foregoing conveys, when the HHD 102 is connected to the computer system 160 so that video processing operations can by performed on the video content stored on the HHD 102, the software application 148 accesses the relevant composite video files and any necessary software infrastructure elements from the internal memory 138 of the HHD 102 and also accesses other supporting software components stored in the internal memory 138 on an ongoing basis. Further, the modified composite video files may optionally be transmitted back to the internal memory 138 for storage. Thus, the HHD 102 remains coupled to the computer system 160 while the software application 148 is executing and video processing operations are being performed. Such a use scenario provides an opportunity to charge the battery 150 via the computer system 160, as described in greater detail below.

Figure 2A:
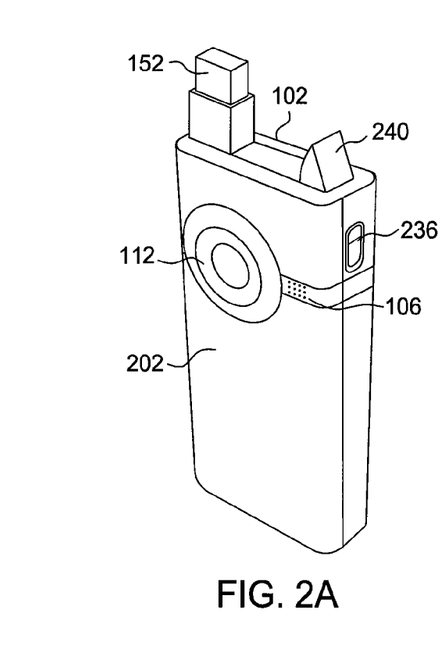
FIG. 2A is an isometric view of the hand-held device, according to one embodiment of the invention.
Figure 2B:
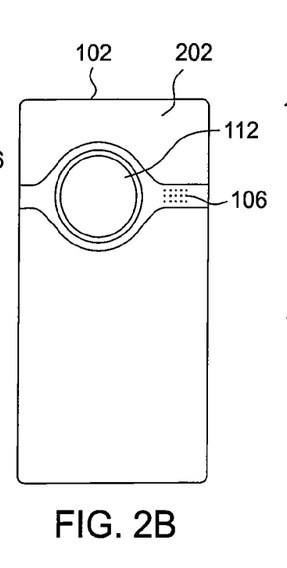
FIG. 2B is a front view of the hand-held device, according to one embodiment of the invention.

FIG. 2A is an isometric view of the HHD 102 of FIG. 1, according to one embodiment of the invention. As shown, the HHD 102 includes a front side 202, the data connector 152, a catch mechanism 240, the microphone 106, optical components 112, and a connector release 236. The data connector 152 may be in an extended position, as shown in FIG. 2A, or may be in a retracted position and contained within the HHD 102. When the data connector 152 is extended, the catch mechanism 240 is in an open state, as shown in FIG. 2A. FIG. 2B is a front view of the HHD 102, according to one embodiment of the invention. This view of the HHD 102 includes several of the components illustrated in FIG. 2A, including the front side 202, the microphone 106, and the optical components 112.

Figure 2C:
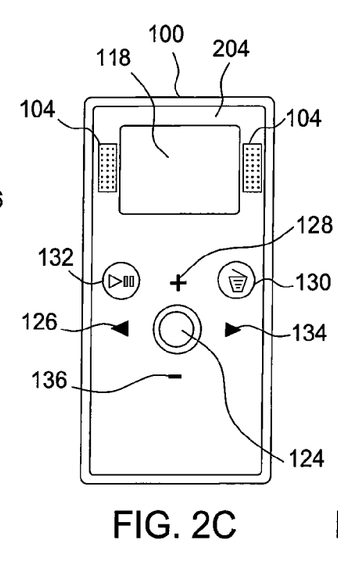
FIG. 2C is a back view of the hand-held device, according to one embodiment of the invention.

FIG. 2C is a back view of the HHD 102, according to one embodiment of the invention. A shown, the HHD 102 includes a back side 204, speakers 104, the digital viewfinder 118, the record button 124, as well as the set of capacitive-touch (CT) buttons 126, 128, 130, 132, 134, 136 embedded within the back side 204. The CT buttons include the left button 126, the right button 134, the increase button 128, the decrease button 136, the play/pause button 132, and the delete button 130.

In one embodiment, the record button 124, the play/pause button 132, and the delete button 130, collectively, may be considered the "primary" interface buttons 120; whereas, the remaining interface buttons 120 may be considered "secondary." The secondary interface buttons 120 are "flat" CT buttons that lie in the same plane as the back side 204 of the HHD 110. By contrast, the primary interface buttons 120 may be slightly recessed from back side 204 of the HHD 110 (and/or concave relative to the back side 204 of the HHD 102) so that, for example, the user can easily locate and use these buttons in a low-light situation (e.g., in the dark) or without looking at the back of the HHD 110.

Figure 2D:
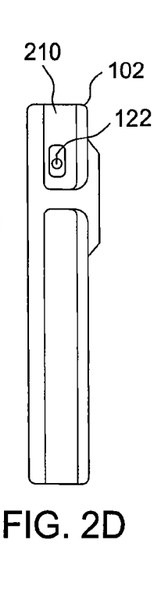
FIG. 2D is a left-side view of the hand-held device, according to one embodiment of the invention.
Figure 2E:
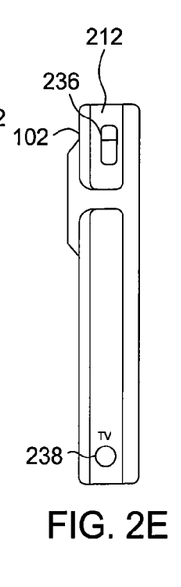
FIG. 2E is a right-side view of the hand-held device, according to one embodiment of the invention.

FIG. 2D is a left-side view of the HHD 102, according to one embodiment of the invention. As shown, the HHD 102 includes a left side 210 that includes the power button 122 that is used to power the HHD 102 on and off. FIG. 2E is a right-side view of the HHD 102, according to one embodiment of the invention. As shown, the HHD 102 includes a right side 212 that includes a connector release 236 and a TV out port 238. The connector release 236 is used to release the data connector 152 into an extended position. For example, in one embodiment, the data connector 152 is spring-loaded such that when the user presses the data connector release 236 downwards, the data connector 152 is released into the extended position. The TV out port 238 is used to connect the HHD 102 to a TV with a cable (not shown) to allow composite video files stored in the HHD 102 to be displayed on the TV. In some embodiments, the TV out port 238 is implemented as a HDMI port or any other technically feasible type of output port.

Figure 2F:
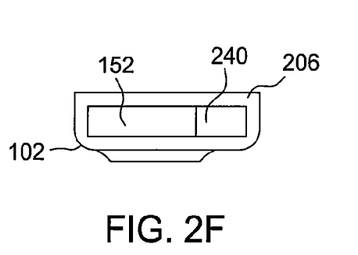
FIG. 2F is a top view of the hand-held device, according to one embodiment of the invention.

FIG. 2F is a top view of the HHD 102, according to one embodiment of the invention. As shown, the HHD 102 has a top side 206 that includes one side of the data connector 152 and one side of the catch mechanism 240. When the data connector 152 is retracted, the catch mechanism 240 conceals the male portion of the data connector 152 (i.e., the portion of the data connector 152 that actually plugs into the AC adapter 164 or the computer system 160), thereby maintaining the sleek look and feel of the HHD 102.

Figure 2G:
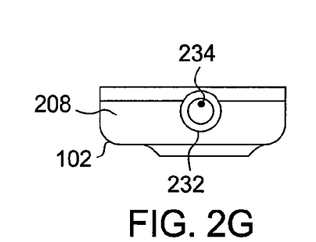
FIG. 2G is a bottom view of the hand-held device, according to one embodiment of the invention.

FIG. 2G is a bottom view of the HHD 102, according to one embodiment of the invention. As shown, the HHD 102 has a bottom side 208 that includes a tripod mount 232, which enables the HHD 102 to be mounted on a standard tripod so that a user may capture video and audio footage without actually holding the HHD 102. A reset button 234, which is accessible using a pin or other slender implement, may be located within the tripod mount 232. The user may press the reset button 234 to perform a "hard reset" of the HHD 102 that may restore the original factory settings of the HHD 102.

Figure 3A:
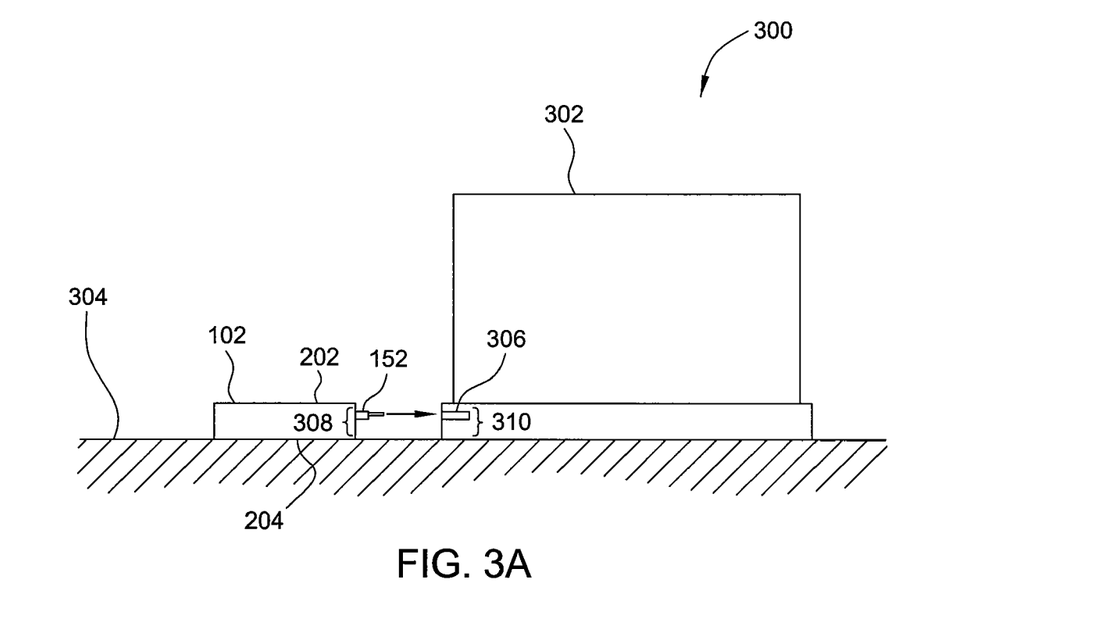
FIGS. 3A-3B are conceptual illustrations of how the hand-held device of FIGS. 2A-2G may be coupled to a laptop computer, according to one embodiment of the invention.

FIG. 3A is a conceptual illustration of how the HHD 102 of FIGS. 2A-2G may be coupled to a laptop computer 302, according to one embodiment of the invention. As shown, both the HHD 102 and the laptop computer 302 are resting on a flat surface 304. The HHD 102 is oriented on the flat surface 304 so that the back side 204 is in direct contact with the flat surface 304, and the front side 202 is facing away from the flat surface 304. When oriented in this manner, the HHD 102 is highly stable and is not prone to toppling or tipping.

The data connector 152 is extended from the HHD 102 and is directed towards a data port 306 included in the laptop computer 302. The data port 306 may be a universal serial bus (USB) port, a firewire port, a serial port or another type of port that is capable of receiving the data connector 152. The data port 306 is elevated from the flat surface 304 by a vertical distance 310. Conveniently, the data connector 152 is positioned relative to the HHD 102 so that when the HHD 102 is oriented, as shown, the data connector 152 is elevated from the flat surface 304 by a vertical distance 308, which is substantially equal to vertical distance 310. The data connector 152 may then be inserted into the data port 306 by simply sliding the HHD 102 across the flat surface 304 towards the laptop computer 302. The positioning of the data connector 152 relative to the data port 306 provides a simple and stable way to connect the data connector 152 to the data port 306 of the laptop computer 302, providing a more robust connection relative to conventional approaches.

Figure 3B:
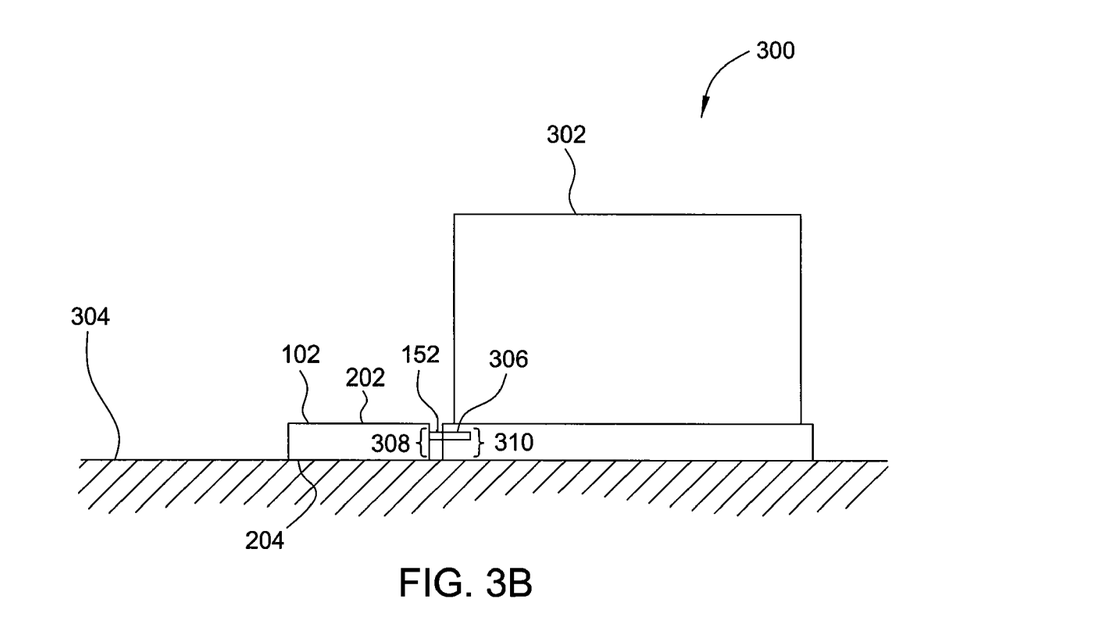

FIG. 3B shows the data connector 152 of the HHD 102 inserted into the data port 306 of the laptop computer 302. As described above in FIG. 3A, the data connector 152 is elevated from the flat surface 304 by a vertical distance 308, which is substantially equal to the vertical distance 310 between the data port 306 and the flat surface 304. When the HHD 102 is coupled with the laptop computer 302, as shown, the connection between the data connector 152 and the data port 306 is highly stable because the HHD 102 is resting on the back side 204 and is not prone to being displaced or toppled. Additionally, the position of the data connector 152 relative to the data port 306 substantially reduces or eliminates torque-related stresses that may be placed on either the data connector 152 and/or the data port 306 because the weight of the HHD 102 is not being supported by the data connector 152. Also, in the configuration shown, the data connector 152 is relatively close to the flat surface 304. Consequently, relative to prior art HHDs that are larger and/or thicker than the HHD 102, the data connector 152 can be connected more easily to laptops and other computers having standard USB data port configurations.

In other embodiments, the data connector 152 may be oriented such that the HHD 102 lies on either the left side 210 or the right side 212 when coupled to the laptop computer 302 via the data connector 152. Again, such a configuration provides a stable and robust connection between the HHD 102 and the laptop computer 302 since, among other things, the torque-related stresses placed on the data connector 152 and/or the data port 306 are reduced.

Figure 4:
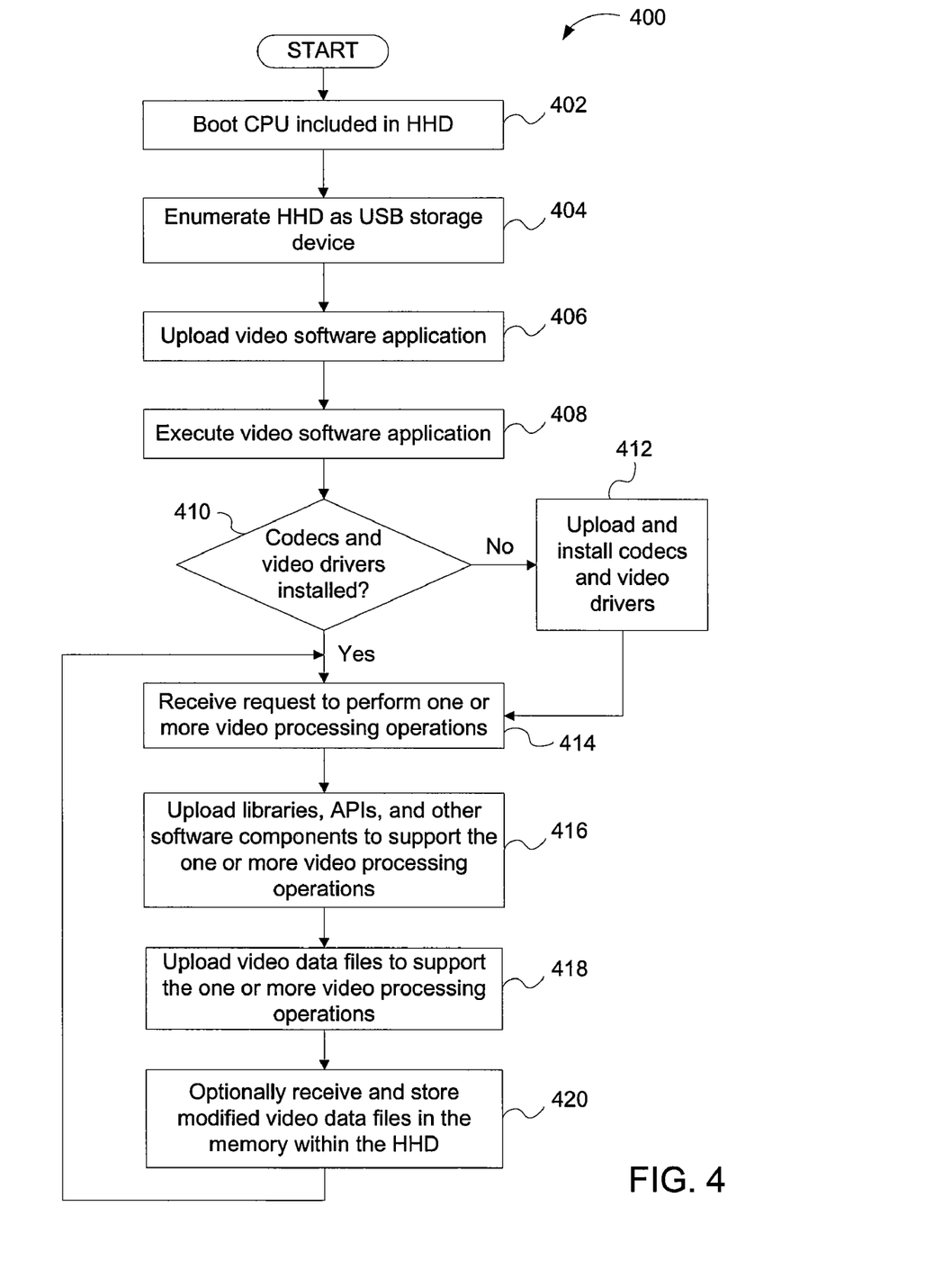
FIG. 4 is a flow diagram of method steps for interacting with, on a host computer system, video content stored in the internal memory of the hand-held device of FIG. 1, according to one embodiment of the invention.

FIG. 4 is a flow diagram of method steps for interacting with, on the computer system 160, video content stored in the internal memory 138 of the HHD 102 of FIG. 1, according to one embodiment of the invention. Persons skilled in the art will understand that, even though the method 400 is described in conjunction with the systems of FIGS. 1-3B, any system configured to perform the method steps, in any order, is within the scope of the invention.

As shown, the method 400 begins at step 402, where the CPU 116 included within the HHD 102 boots, powering on to perform processing operations. As described below in FIG. 5, the secondary processor 142 allows the CPU 116 to boot only after confirming that the battery 150 has a pre-determined, requisite level of charge. At step 404, the secondary processor 142 causes the operating system executing on the computer system 160 to enumerate the HHD 102 as a USB storage device. Enumerating the HHD 102 allows the computer system 160 to access content stored in the internal memory 138 within the HHD 102, such as the software application 148, the codecs 170, the video drivers 172, the software libraries 174, the APIs 176, and any other software infrastructure elements or supporting software components needed for the application 148 to execute properly on the computer system 160.

At step 406, the CPU 116 causes the software application to be uploaded to the memory 162 in the computer system 160. The software application 148 may then be used to access and manipulate video content stored within the memory 138 of the HHD 102. Once the software application 148 is uploaded, at step 408, the operating system executing on the computer system 160 executes the software application 148.

At step 410, the software application 148 determines whether the codecs 170, the video drivers 172 and other software infrastructure elements needed to support the application 148 are installed on the computer system 160. In one embodiment, the software application 148 may check the registry entries or keys of the computer system 160 to determine which codecs 170, video drivers 172, and/or software infrastructure elements were previously installed on the computer system 160. If one or more of the requisite software infrastructure elements are not installed on the computer system 160, then, at step 412, the CPU 116 causes the missing software infrastructure elements, including any missing codecs 170 and/or video drivers 172, to be uploaded from the internal memory 138 of the HHD 102 and installed on the computer system 160. The method 400 then proceed to step 414. If, at step 410, all of the requisite software infrastructure elements, including all necessary codecs 170 and video drivers 172, are installed on the computer system 160, then the method 400 proceeds directly to step 414.

At step 414, the software application 148 receives a request from the user to perform one or more video processing operations on certain video content stored within the internal memory 138 of the HHD 102. The one or more video processing operations may include, without limitation, transferring composite video files from the internal memory 138 to the memory 162 within the computer system 160, playing composite video files, deleting composite video files from the internal memory 138, editing composite video files stored in the internal memory 138, merging two composite video files stored in the internal memory 138, attaching a composite video file to an email message, or uploading a composite video file to an online server.

At step 416, the CPU 116 within the HHD 102 causes any software libraries 174, APIs 176 or other supporting software components required to perform the one or more video processing operations to be uploaded from the internal memory 138 of the HHD 102 to the computer system 160. At step 418, the CPU 116 causes one or more composite video files on which the one or more video processing operations will be performed to be uploaded from the internal memory 138 of the HHD 102 to the computer system 160. Once all of the necessary supporting software components and composite video files are uploaded, the software application 148 executing on the computer system 160 performs the one or more requested video processing operations on the relevant composite video file(s) to generate one or more modified composite video files.

At step 420, based on whether the user wants to store the modified composite video file(s) on the HHD 102, the CPU 116 may receive the modified composite video file(s) from the computer system 160. In such cases, the CPU 116 causes the modified composite video file(s) to be stored in the internal memory 138 within the HHD 102. Alternatively, the modified composite video files may be saved to the computer system 160 and not transferred back to the internal memory 138.

Persons skilled in the art will recognize that with respect to the above flow, the HHD 102 remains coupled to the computer system 160 while the user is performing processing operations on the video content stored in the HHD 102. Consequently, as described below in FIG. 5, the battery 150 of the HHD 102 may be charged simultaneously with performing those processing operations on the video content. In addition, as configured, if the HHD 102 decouples from the computer system 160 while those processing operations are being performed, then those or subsequent processing operations will eventually fail since software application 148 will no longer be able to access video content and/or supporting software components from the HHD 102.

Figure 5:
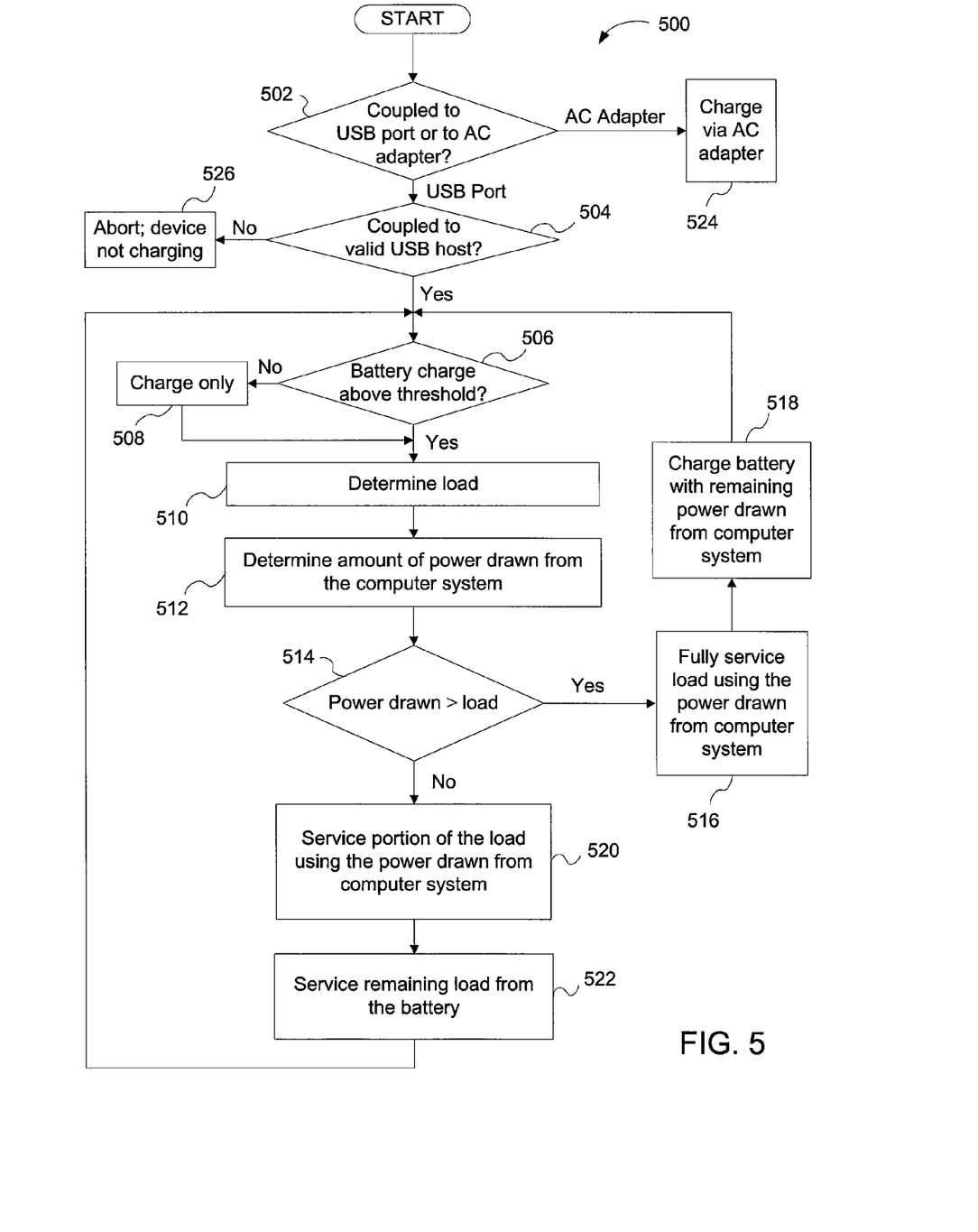
FIG. 5 is a flow diagram of method steps for charging the battery of the hand-held device of FIG. 1, according to one embodiment of the invention.

FIG. 5 is a flow diagram of method steps for charging the battery 150 of the HHD 102 of FIG. 1, according to one embodiment of the invention. Persons skilled in the art will understand that, even though the method 500 is described in conjunction with the systems of FIGS. 1-3B, any system configured to perform the method steps, in any order, is within the scope of the invention.

As shown, the method 500 begins at step 502, where the secondary processor 142 determines whether the HHD 102 is coupled to a USB port of the computer system 160 or to the AC adapter 164. If the HHD 102 is coupled to the AC adapter 164, then the method 400 proceeds to step 524, where the battery 150 is charged via the AC adapter 164. In such cases, the data connector 152 provides a path to the power supply 110 for the power supplied by the AC adapter 164. The power supply 110 may include one or more buck regulators and a switch-mode charger to supply the main power rails of the HHD 102 and manage the battery charging circuit to provide power to the various components of the HHD 102. In one embodiment, the secondary processor 142 detects a different pin configuration to differentiate between the data connector 152 being coupled to the AC adapter 164 and being coupled to the computer system 160 via the USB port.

If, however, at step 502, the HHD 102 is coupled to the USB port of the computer system 160, instead of the AC adapter 164, then the method 500 proceeds to step 504. At step 504, the secondary processor 142 determines whether the computer system 160 to which the HHD 102 is coupled includes a valid USB host. If the computer system 160 does not include a valid USB host, then the method 500 proceeds to step 526, where the charging scheme is aborted. If the computer system 160 does include a valid USB host, then the method 500 proceeds to step 506.

At step 506, the secondary processor 142 determines whether the charge level of the battery 150 is above a predetermined threshold level. In one embodiment, the threshold level is approximately 10% of the charge capacity of the battery 150. If the charge level of the battery 150 is below the predetermined threshold level, then the secondary processor 142 may cause the CPU 116 to power off (when the CPU 116 is powered on) or prevent the CPU 116 from booting (when the CPU is powered off). Determining whether the battery charge level is above the predetermined threshold level ensures that the CPU 116 does not boot and/or operate in a low power condition. As is well-known, booting and/or operating the CPU 116 from a low power condition could damage the CPU 116. The secondary processor 142 is configured to monitor the gas gauge 144 for a LOW_BAT flag to determine whether the battery 150 contains an amount of charge above the threshold amount. A LOW_BAT flag that is set to ON indicates that the charge level of the battery 150 is below the threshold amount. In this situation, the secondary processor 142 prevents the CPU 116 from booting, and the method 500 proceeds to step 508.

At step 508, the secondary processor 142 charges the battery 150 via the data connector 152 and provides power to the power supply 110 with power drawn from the computer system 160. In one embodiment, the secondary processor 142 continues to charge the battery 150 until the battery charge level reaches some predetermined amount above the threshold amount. For example, if the threshold amount is 10% of the total charge capacity of the battery 150, then the secondary processor 142 may continue to charge the battery 150 until the charge level reaches approximately 15% of the total charge capacity of the battery 150. The method then proceeds to step 510. If, at step 506, the secondary processor 142 determines that the charge of the battery 150 is above the threshold amount, then the method 500 proceeds directly to step 510.

At step 510, the secondary processor 142 determines a load of the components of the HHD 102. The load is a total amount of power consumed by the various components of the HHD 102 at a particular point in time. For example, the load may reflect the total amount of power consumed by the data connector 152, the speaker 104, the microphone 106, the power supply 110, the battery 150, the optical components 112, the digital video image sensor 114, the CPU 116, the digital viewfinder 118, the interface buttons 120, the internal memory 138, the secondary processor 142, and the gas gauge 144 at some particular point in time. As persons skilled in the art will recognize, at various points in time, performing one or more of the method steps of FIG. 4 generates all or a portion of the load of the components of the HHD 102.

At step 512, the secondary processor 142 determines an amount of power being drawn from the computer system 160 via the data connector 152. At step 514, the secondary processor 142 determines whether the amount of power being drawn from the computer system 160 is greater than the load determined at step 510. If the amount of power being drawn from the computer system 160 is less than the load, then the method 500 proceeds to step 520, wherein the secondary processor 142 causes a portion of the load to be serviced by the power drawn from the computer system 160. In step 520, all of the power drawn from the computer system 160 is used to service the load; however, since the amount of power being drawn from the computer system 160 is less than the load, the entire load cannot be serviced by the power drawn from the computer system 160.

At step 522, the secondary processor 142 services the remaining load from the battery 150. The charge stored within the battery 150 is converted by the power supply 110 to service this remaining load. In this fashion, the battery 150 is discharging at step 522. The method 500, then, returns to step 506, where the secondary processor 142 once again determines whether the battery charge level is above the threshold amount. If the method 500 continues to loop through steps 506-510-512-514-520-522, then the battery 150 will continue to discharge to satisfy the load requirements of the HHD 102. If at any time during this looping between steps 506-510-512-514-520-522 the battery charge level drops below the threshold amount, then the method 500 proceeds to step 508, where the HHD 102 is powered off while the battery 150 recharges to the predetermined amount that may be greater than the threshold amount, as described above. Determining whether the battery charge level is above the threshold level ensures that the battery 150 does not discharge fully. As is well-known, allowing the battery 150 to discharge fully could damage the battery 150 by shortening the lifespan and charging ability of the battery 150.

Referring back now to step 514, if the secondary processor 142 determines that the amount of power drawn from the computer system 160 is greater than the load, then the method 500 proceeds to step 516. At step 516, the secondary processor 142 fully services the load using the power drawn from the computer system 160. At step 518, the battery 150 is charged with the remaining power drawn from the computer system 160. Since not all of the power drawn from the computer system 160 is consumed to service the load, there is "extra" power that is used to charge the battery 150. In a situation where, at step 514, the power drawn from the computer system 160 is equal to the load, then the method 500 proceeds to step 516, where the load is fully serviced with the power drawn from the computer system 160 and step 518 is skipped. The method 500 then returns to step 506, described above.

In one embodiment, the method steps set forth in FIG. 5 are performed by the secondary processor 142 on an ongoing basis in the background relative to the other functions being performed by the HHD 102.

Certain embodiments of the invention set forth an "active system," where the power being drawn from the computer system 160 is monitored and actively directed around the HHD 102 via the secondary processor 142 and power supply 110 (see, for example, step 512). Alternative embodiments of the invention may operate as a "passive system" that does not actively monitor the power available from the computer system 160. In such embodiments, a power deficit from the computer system 160 acts as a power drain and draws power from the battery 150. Any excess power drawn from the computer system 160 is likewise automatically used to charge the battery 150.

One advantage of the systems and methods described herein is that they provide an opportunity for the battery 150 to charge while the HHD 102 is plugged into the computer system 160 to access and manipulate the video content stored in the internal memory 138 of the HHD 102. Since a user is required to plug the HHD 102 into the computer system 160 to access and manipulate the video content, as well as to optionally write the modified content back to the internal memory 138, charging the battery 150 is a natural and symbiotic function of using the HHD 102.

Another advantage is that the operations related to editing and manipulating the video content are performed by the processor included in the computer system 160 instead of the CPU 116 within the HHD 102. Leveraging the processing capabilities of the computer system 160 in this fashion reduces the processing workload placed on the CPU 116 while the battery 150 charging, thereby reducing the load of the HHD 102 and allowing the battery 150 to charge faster.

Yet another advantage is that storing the composite video files, the software application 148, the software infrastructure elements, and other supporting software components in the internal memory 138 increases the portability of the HHD 102 since the HHD 102 can be coupled to any computer system 160, not just a user's primary computer, to edit the composite video files. Further, since only the specific video files being edited or manipulated and the particular software components required to perform these video processing operations are actually transferred to the computer system 160, the user does not have to wait for all of the video files and/or software components to be transferred to the computer system 160 before beginning the video editing process. Additionally, the systems and methods described herein enable the user to perform more advanced video processing operations, other than simply playing back and transferring video files, while simultaneously providing an opportunity to charge the HHD 102, thus presenting a significant improvement over prior art hand-held electronic device designs.

While the forgoing is directed to embodiments of the invention, other and further embodiments of the invention may be devised without departing from the basic scope thereof. For example, aspects of the invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the invention is determined by the claims that follow.

We claim:

1. A method for modifying video content stored on a hand-held digital video camera (DVC), the method comprising:

transmitting video data to a computer system to which the hand-held DVC is coupled via a data connector;

receiving a request for a set of instructions related to a processing operation being performed on the computer system and involving the video data;

transmitting the set of instructions to the computer system via the data connector;

drawing power from the computer system via the data connector;

charging at least in part a battery associated with the hand-held DVC with the power drawn from the computer system, wherein the hand-held DVC remains coupled to the computer system via the data connector for the steps of transmitting, receiving, drawing, and charging;

determining a load associated with the hand-held DVC that indicates a total amount of power consumed by the hand-held DVC at a particular point in time;

determining that the power drawn from the computer system via the data connector is less than the load;

causing a portion of the load to be serviced by the power drawn from the computer system; and causing a remaining portion of the load to be serviced by power drawn from the battery.

2. The method of claim 1, further comprising the step of determining whether a charge level of the battery is above a predetermined threshold level.

3. The method of claim 2, wherein the predetermined threshold level is approximately 10% of a charge capacity of the battery.

4. The method of claim 3, wherein the charge level of the battery is below the predetermined threshold level, and further comprising the step of charging the battery via the data connector with power drawn from the computer system until the charge level of the battery reaches a predetermined level above the predetermined threshold level.

5. The method of claim 4, wherein the predetermined level is approximately 15% of the charge capacity of the battery.

6. A non-transitory computer-readable medium storing instructions that, when executed by a processor, cause the processor to effect the charging of one or more batteries included within a hand-held digital video camera (DVC), by performing the steps of:

determining that the digital video camera is coupled to a data port of a computer system via a data connector;

determining whether a charge level of a battery included within the hand-held DVC is above a predetermined threshold level;

determining a load of the hand-held DVC that indicates a total amount of power consumed by various components of the hand-held DVC at a particular point in time;

determining an amount of power being drawn from the computer system via the data connector;

causing at least a portion of the load to be serviced by at least a portion of the power being drawn from the computer system;

determining whether the power being drawn from the computer system via the data connector is greater than the load;

determining that the power being drawn from the computer system via the data connector is less than the load;

causing a portion of the load to be serviced by the power being drawn from the computer system; and causing a remaining portion of the load to be serviced by power being drawn from the battery.

7. The computer-readable medium of claim 6, wherein the predetermined threshold level is approximately 10% of a charge capacity of the battery.

8. The computer-readable medium of claim 7, wherein the charge level of the battery is below the predetermined threshold level, and further comprising the step of causing the battery to be charged via the data connector with the power being drawn from the computer system until the charge level of the battery reaches a predetermined level above the predetermined threshold level.

9. The computer-readable medium of claim 8, wherein the predetermined level is approximately 15% of the charge capacity of the battery.

10. The computer-readable medium of claim 6, further comprising the steps of:
determining that the charge level of a battery has dropped below the predetermined threshold level as a consequence of power being drawn from the battery to service the remaining portion of the load; and
causing a central processing unit included within the hand-held DVC to be powered off.

11. The computer-readable medium of claim 6, wherein determining the charge level of the battery comprises querying a gas gauge microprocessor configured to monitor a low battery charge flag associated with the battery to determine.

12. The computer-readable medium of claim 11, further comprising the step of preventing a central processing unit included within the digital video camera from powering on when the charge level of the battery is below the predetermined threshold level.

13. A hand-held digital video camera (DVC), comprising:
a data connector configured to couple the hand-held DVC to a data port of a computer system;
a processor;
a memory storing instructions that, when executed by the processor, cause the processor to transmit video data to the computer system via the data connector related to a processing operation being performed on the computer system and involving the video data;
a battery; and
a power supply configured to:
draw power from the computer system via the data connector, and
charge at least in part the battery with the power drawn from the computer system,
wherein the power supply draws power and charges the battery while the DVC is coupled to the computer system via the data connector and video data and/or instructions are being transferred to the computer system via the data connector,
wherein the memory further stores instructions that cause the processor to:
determine a load associated with the hand-held DVC that indicates a total amount of power consumed by the hand-held DVC at a particular point in time, and
determine that the power drawn from the computer system via the data connector is less than the load, wherein the power supply is further configured to service the load using the power drawn from the computer system and to service a remaining portion of the load using power drawn from the battery.

14. The hand-held DVC of claim 13, wherein the memory further stores instructions that cause the processor to determine whether a charge level of the battery is above a predetermined threshold level.

15. The hand-held DVC of claim 14, wherein the predetermined threshold level is approximately 10% of a charge capacity of the battery.

16. The hand-held DVC of claim 15, wherein the charge level of the battery is below the predetermined threshold level, and wherein the power supply is further configured to charge the battery via the data connector with power drawn from the computer system until the charge level of the battery reaches a predetermined level above the predetermined threshold level.

17. The hand-held DVC of claim 16, wherein the predetermined level is approximately 15% of the charge capacity of the battery.

18. A method for modifying video content stored on a hand-held digital video camera (DVC), the method comprising:
transmitting video data to a computer system to which the hand-held DVC is coupled via a data connector;
receiving a request for a set of instructions related to a processing operation being performed on the computer system and involving the video data;
transmitting the set of instructions to the computer system via the data connector;
drawing power from the computer system via the data connector;
charging at least in part a battery associated with the hand-held DVC with the power drawn from the computer system, wherein the hand-held DVC remains coupled to the computer system via the data connector for the steps of transmitting, receiving, drawing, and charging;
determining a load associated with the hand-held DVC that indicates a total amount of power consumed by the hand-held DVC at a particular point in time;
determining that the power drawn from the computer system via the data connector is greater than the load;
causing the load to be fully serviced using the power drawn from the computer system; and
charging the battery with any remaining power drawn from the computer system that is not being used to service the load.

19. The method of claim 18, further comprising the step of determining whether a charge level of the battery is above a predetermined threshold level.

20. The method of claim 19, wherein the predetermined threshold level is approximately 10% of a charge capacity of the battery.

21. The method of claim 20, wherein the charge level of the battery is below the predetermined threshold level, and further comprising the step of charging the battery via the data connector with power drawn from the computer system until the charge level of the battery reaches a predetermined level above the predetermined threshold level.

22. The method of claim 21, wherein the predetermined level is approximately 15% of the charge capacity of the battery.

23. A non-transitory computer-readable medium storing instructions that, when executed by a processor, cause the processor to effect the charging of one or more batteries included within a hand-held digital video camera (DVC), by performing the steps of:
determining that the digital video camera is coupled to a data port of a computer system via a data connector;
determining whether a charge level of a battery included within the hand-held DVC is above a predetermined threshold level;
determining a load of the hand-held DVC that indicates a total amount of power consumed by various components of the hand-held DVC at a particular point in time;
determining an amount of power being drawn from the computer system via the data connector;

causing at least a portion of the load to be serviced by at least a portion of the power being drawn from the computer system;

determining whether the power being drawn from the computer system via the data connector is greater than the load;

determining that the power being drawn from the computer system via the data connector is greater than the load;

causing the load to be fully serviced using the power being drawn from the computer system; and charging the battery with any remaining power being drawn from the computer system that is not being used to service the load.

24. The computer-readable medium of claim 23, wherein the predetermined threshold level is approximately 10% of a charge capacity of the battery.

25. The computer-readable medium of claim 24, wherein the charge level of the battery is below the predetermined threshold level, and further comprising the step of causing the battery to be charged via the data connector with the power being drawn from the computer system until the charge level of the battery reaches a predetermined level above the predetermined threshold level.

26. The computer-readable medium of claim 25, wherein the predetermined level is approximately 15% of the charge capacity of the battery.

27. The computer-readable medium of claim 23, wherein determining the charge level of the battery comprises querying a gas gauge microprocessor configured to monitor a low battery charge flag associated with the battery to determine.

28. The computer-readable medium of claim 27, further comprising the step of preventing a central processing unit included within the digital video camera from powering on when the charge level of the battery is below the predetermined threshold level.

29. A hand-held digital video camera (DVC), comprising:
a data connector configured to couple the hand-held DVC to a data port of a computer system;
a processor;
a memory storing instructions that, when executed by the processor, cause the processor to transmit video data to the computer system via the data connector related to a processing operation being performed on the computer system and involving the video data;
a battery; and
a power supply configured to:
draw power from the computer system via the data connector, and
charge at least in part the battery with the power drawn from the computer system,
wherein the power supply draws power and charges the battery while the DVC is coupled to the computer system via the data connector and video data and/or instructions are being transferred to the computer system via the data connector,
wherein the memory further stores instructions that cause the processor to:
determine a load associated with the hand-held DVC that indicates a total amount of power consumed by the hand-held DVC at a particular point in time, and
determine that the power drawn from the computer system via the data connector is greater than the load, wherein the power supply is further configured to fully service the load using the power drawn from the computer system and to charge the battery with any remaining power drawn from the computer system that is not being used to service the load.

30. The hand-held DVC of claim 29, wherein the memory further stores instructions that cause the processor to determine whether a charge level of the battery is above a predetermined threshold level.

31. The hand-held DVC of claim 30, wherein the predetermined threshold level is approximately 10% of a charge capacity of the battery.

32. The hand-held DVC of claim 31, wherein the charge level of the battery is below the predetermined threshold level, and wherein the power supply is further configured to charge the battery via the data connector with power drawn from the computer system until the charge level of the battery reaches a predetermined level above the predetermined threshold level.

33. The hand-held DVC of claim 32, wherein the predetermined level is approximately 15% of the charge capacity of the battery.

* * * * *